US012742398B2

(12) United States Patent
Smiddy et al.

(10) Patent No.: US 12,742,398 B2
(45) Date of Patent: Sep. 22, 2026

(54) CMC COMPONENT WITH STRUCTURE FOR DIRECTING COOLING AIR FLOW

(71) Applicant: RTX CORPORATION, Farmington, CT (US)

(72) Inventors: Winston Smiddy, South Windsor, CT (US); Peter Wilkins, Manchester, CT (US); Alex J. Schneider, Manchester, CT (US); Paul M. Lutjen, Kennebunkport, ME (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 19/023,083

(22) Filed: Jan. 15, 2025

(65) Prior Publication Data

US 2026/0201811 A1 Jul. 16, 2026

(51) Int. Cl.

| | |
|---|---|
| ***F01D 11/24*** | (2006.01) |
| ***F01D 9/04*** | (2006.01) |
| ***F01D 11/08*** | (2006.01) |
| ***F01D 25/12*** | (2006.01) |
| *F23R 3/00* | (2006.01) |

(52) U.S. Cl.

CPC ................ *F01D 11/24* (2013.01); *F01D 9/04* (2013.01); *F01D 11/08* (2013.01); *F01D 25/12* (2013.01); *F05D 2220/32* (2013.01); *F05D 2240/35* (2013.01); *F05D 2240/55* (2013.01); *F05D 2260/201* (2013.01); *F05D 2300/6033* (2013.01); *F23R 3/007* (2013.01)

(58) Field of Classification Search

CPC ... F01D 5/066; F01D 9/04; F01D 9/06; F01D 9/065; F01D 11/08; F01D 11/24; F01D 25/12; F01D 25/243; F01D 25/246

See application file for complete search history.

(56) References Cited

U.S. PATENT DOCUMENTS

| | | | | |
|---|---|---|---|---|
| 7,044,709 | B2 | 5/2006 | Bruce et al. | |
| 7,494,317 | B2 * | 2/2009 | Keller | F01D 11/08 415/173.1 |
| 7,556,475 | B2 * | 7/2009 | Roberts, III | F01D 11/08 415/173.1 |
| 9,334,738 | B2 * | 5/2016 | Nereim | F01D 5/06 |
| 9,863,265 | B2 * | 1/2018 | Stapleton | F01D 11/08 |
| 10,100,654 | B2 | 10/2018 | Vetters et al. | |
| 10,301,960 | B2 * | 5/2019 | Stapleton | F01D 25/246 |
| 10,422,244 | B2 * | 9/2019 | Shapiro | F01D 9/04 |
| 10,801,350 | B2 | 10/2020 | Walston et al. | |
| 10,858,949 | B2 * | 12/2020 | Walston | F01D 25/005 |
| 11,208,896 | B1 | 12/2021 | Baucco et al. | |
| 11,215,080 | B1 | 1/2022 | Freeman et al. | |

(Continued)

*Primary Examiner* — Christopher R Legendre

(74) *Attorney, Agent, or Firm* — Millen, White, Zelano & Branigan, P.C.; Brion P. Heaney

(57) ABSTRACT

Attachment pins are used to attach a ceramic matrix composite (CMC) component to a support structure, the attachment pins passing through openings in flange structures extending from a surface of the CMC component. The attachment pins are provided with a cooling air passageway extending in an axial direction, the cooling passageway having an inlet opening in a first end of the attachment pin for introduction of cooling air, and each attachment pin having one or more cooling air outlets extending radially from the cooling air passageway to provide for discharge of cooling air in a desired direction.

17 Claims, 5 Drawing Sheets

(56) References Cited

U.S. PATENT DOCUMENTS

| | | | | |
|---|---|---|---|---|
| 11,220,928 | B1 * | 1/2022 | Baucco | F02C 7/12 |
| 11,220,930 | B2 * | 1/2022 | Starr | F01D 25/246 |
| 11,629,607 | B2 * | 4/2023 | Freeman | F01D 25/246<br>415/200 |

* cited by examiner

CMC COMPONENT WITH STRUCTURE FOR DIRECTING COOLING AIR FLOW

FIELD OF THE INVENTION

The present disclosure relates generally to methods for manufacturing ceramic matrix composites (CMCs). In particular, the present disclosure concerns manufacturing CMC components with structures to facilitate cooling and directing/controlling the flow of cooling air.

BACKGROUND OF THE INVENTION

Gas turbine engines, in general, include a fan section, a compressor section, a combustion section, and a turbine section. Air enters through the fan section and is compressed in the compressor section before being introduced into the combustion section. In the combustion section, the air is mixed with fuel and ignited to generate a high-energy, high temperature gas flow. The high-energy, high temperature gas flow is expanded in the turbine section which is used to create thrust and to drive the compressor and fan sections.

Certain components of gas turbine engines are thus exposed to the high-energy, high temperature gas flow (flow path components). Therefore, it is desirable that such flow path components be made of heat-resistant materials, for example, superalloys and ceramic matrix composites (CMCs). While these materials are heat resistant, the operational lifespan of such turbine engine components can be increased by including structures to permit the flow of cooling fluid (e.g., cooling air) to interact with and cool the component.

While CMC materials can withstand much higher operating temperatures than components composed of superalloys, CMCs have comparably lower thermal conductivity than superalloys. Thus, it is particularly desirable to take steps to efficiently cool CMC components using available cooling air flows.

In the cooling of jet engine CMC components, the general flow of the cooling air is in an axial direction, i.e., from the forward end of the engine towards the aft. Directing part of the cooling air towards surfaces of the CMC component can increase the efficient utilization of the cooling air.

There is thus a continuing need for providing alternative and/or improved cooling structures and methods for manufacturing such cooling structures in CMC components that allow for efficient and effective cooling of CMC components exposed to high temperature gas flow.

SUMMARY OF THE INVENTION

In general, the present disclosure relates to methods and devices for directing cooling air in conjunction with cooling CMC components, particularly structures used to direct and/or control cooling air flow towards the outer radial surface of CMC components such as blade outer air seals (BOAS).

The present disclosure is directed, in a first aspect, to an attachment pin comprising an elongated body with a longitudinal axis extending from a first end to a second end, a cooling passageway extending axially from the first end along the longitudinal axis, and one or more cooling air outlets extend radially from the cooling air passageway to provide for discharge of fluid from the cooling passageway.

The present disclosure is also directed, in a further aspect, to a ceramic matrix composite (CMC) component comprising:

- a base having a radial outer surface and a radial inner surface inward surface, the base comprising a plurality of ceramic fiber plies and a ceramic matrix,
- a forward flange structure and an aft flange structure each extending from the radial outer surface of the base, the forward flange structure having a first opening and a second opening, and the aft flange structure has a first opening and a second opening, and
- a first attachment pin and a second attachment pin for attaching the CMC component to a support structure, the first attachment pin passing through the first opening of the forward flange structure and the first opening of the aft flange structure, and the second attachment pin passing through the second opening of the forward flange structure and the second opening of the second flange structure, each of the attachment pins having a first end and a second end, and each of the attachment pins extending in an axial direction from the first end thereof to the second end thereof,
- wherein each of the attachment pins is provided with a cooling air passageway extending in the axial direction, the cooling passageway having an inlet opening in the first end of the attachment pin for introduction of cooling air, and each attachment pin having one or more cooling air outlets extending radially from the cooling air passageway to provide for discharge of cooling air.

The present disclosure is also directed, in a further aspect, to a method of cooling a CMC component, the method comprising:

- providing a CMC component comprising:
  - a base having a radial outer surface and a radial inner surface inward surface, the base comprising a plurality of ceramic fiber plies and a ceramic matrix, and
  - a forward flange structure and an aft flange structure each extending from the radial outer surface of the base, the forward flange structure having a first opening and a second opening, and the aft flange structure has a first opening and a second attachment pin opening, and
- providing a first attachment pin and a second attachment pin for attaching the CMC component to a support structure, the first attachment pin passing through the first opening of the forward flange structure and the first opening of the aft flange structure, and the second attachment pin passing through the second opening of the forward flange structure and the second opening of the second flange structure, each of the attachment pins having a first end and a second end, and each of the attachment pins extending in an axial direction from the first end thereof to the second end thereof,
- wherein each of the attachment pins is provided with a cooling air passageway extending in the axial direction, the cooling passageway having an inlet opening in the first end of the attachment pin for introduction of cooling air, and each attachment pin having one or more cooling air outlets extending radially from the cooling air passageway to provide for discharge of cooling air.

The present disclosure is further directed, in an additional aspect, to a turbine engine comprising:

- a fan section, a compressor section, a combustion chamber, and a turbine section, the turbine section including at least one rotor and one or more turbine blade(s) extending radially outwardly from the at least one rotor;

a blade outer air seal assembly positioned between the one or more turbine blade(s) and an outer casing to the engine;

wherein the blade outer air seal assembly is formed of a plurality blade outer air seal segments, wherein each blade outer air seal segment comprises:

a base having a radial outer surface and a radial inner surface inward surface, the base comprising a plurality of ceramic fiber plies and a ceramic matrix, a forward flange structure and an aft flange structure each extending from the radial outer surface of the base, the forward flange structure having a first opening and a second opening, and the aft flange structure has a first opening and a second opening, and a first attachment pin and a second attachment pin for attaching the CMC component to a support structure, the first attachment pin passing through the first opening of the forward flange structure and the first opening of the aft flange structure, and the second attachment pin passing through the second opening of the forward flange structure and the second opening of the second flange structure, each of the attachment pins having a first end and a second end, and each of the attachment pins extending in an axial direction from the first end thereof to the second end thereof, wherein each of the attachment pins is provided with a cooling air passageway extending in the axial direction, the cooling passageway having an inlet opening in the first end of the attachment pin for introduction of cooling air, and each attachment pin having one or more cooling air outlets extending radially from the cooling air passageway to provide for discharge of cooling air.

In further embodiments of the present disclosure, including further embodiments of the above exemplary embodiments, the cooling air passageway extends from the first end to the second end of the attachment pin.

In further embodiments of the present disclosure, including further embodiments of the above exemplary embodiments, the cooling air passageway does not extend to the second end of the attachment pin.

In further embodiments of the present disclosure, including further embodiments of the above exemplary embodiments, the attachment pin has a circular cross section.

In further embodiments of the present disclosure, including further embodiments of the above exemplary embodiments, the attachment pin has a triangular, square, pentagonal, or octagonal cross section.

In further embodiments of the present disclosure, including further embodiments of the above exemplary embodiments, the base, forward flange structure, and an aft flange structure are made of a SiC/SiC composite.

In further embodiments of the present disclosure, including further embodiments of the above exemplary embodiments, the one or more cooling air outlets includes at least one cooling outlet that directs cooling air towards the outer radial surface of the base.

In further embodiments of the present disclosure, including further embodiments of the above exemplary embodiments, the one or more cooling air outlets includes at least one cooling outlet that directs cooling air at an angle towards the outer radial surface of the base.

In further embodiments of the present disclosure, including further embodiments of the above exemplary embodiments, the the cooling air passageway in each attachment pin extends from the inlet opening in the first end of the attachment pin to an outlet opening in the second end of the attachment pin.

In further embodiments of the present disclosure, including further embodiments of the above exemplary embodiments, each attachment pin has an inlet region extending from the inlet opening in the first end of each attachment pin to the cooling air passageway, and the inlet region has a decreasing diameter from the inlet opening to the cooling air passageway.

In further embodiments of the present disclosure, including further embodiments of the above exemplary embodiments, the inlet region of each attachment pin has a frustoconical shape.

In further embodiments of the present disclosure, including further embodiments of the above exemplary embodiments, the inlet region of each attachment pin is bell-shaped.

In further embodiments of the present disclosure, including further embodiments of the above exemplary embodiments, each attachment pin includes a chock that interacts with a slot within a respective attachment opening in the forward flange structure and/or aft flange structure to prevent rotation of the attachment pin, or each attachment pin includes a slot that interacts with a chock in a respective attachment opening in the forward flange structure and/or aft flange structure to prevent rotation of the attachment pin.

In further embodiments of the present disclosure, including further embodiments of the above exemplary embodiments, the base further comprises at least one cooling cavity that extends from the outer radial surface of the base into an interior region of the base, the at least one cooling cavity having a cavity opening at the outer radial surface of the base, the at least one cooling cavity being defined by cavity side walls and a cavity bottom wall, and wherein the one or more cooling air outlets direct cooling air towards the at least one cooling cavity.

In further embodiments of the present disclosure, including further embodiments of the above exemplary embodiments, the at least one cooling cavity is covered by a cover plate or impingement plate having one or more cooling holes to allow cooling air directed by one or more cooling air outlets to enter the at least one cooling cavity.

In further embodiments of the present disclosure, including further embodiments of the above exemplary embodiments, the component is a combustor liner. In further embodiments of the present disclosure, including further embodiments of the above exemplary embodiments, the component is a blade outer air seal (BOAS) segment.

In further embodiments of the present disclosure, including further embodiments of the above exemplary embodiments, the component is a BOAS assembly comprising a plurality of BOAS segments arranged to form an annular shaped structure.

BRIEF DESCRIPTION OF FIGURES

The features of the disclosure believed to be novel and the elements characteristic of the invention are set forth with particularity in the appended claims. The figures are for illustration purposes only and are not drawn to scale. The disclosure itself, however, both as to organization and method of operation, can best be understood by reference to the description of the preferred embodiment(s) which follows, taken in conjunction with the accompanying drawings in which:

DETAILED DESCRIPTION OF THE INVENTION

Figure 1:
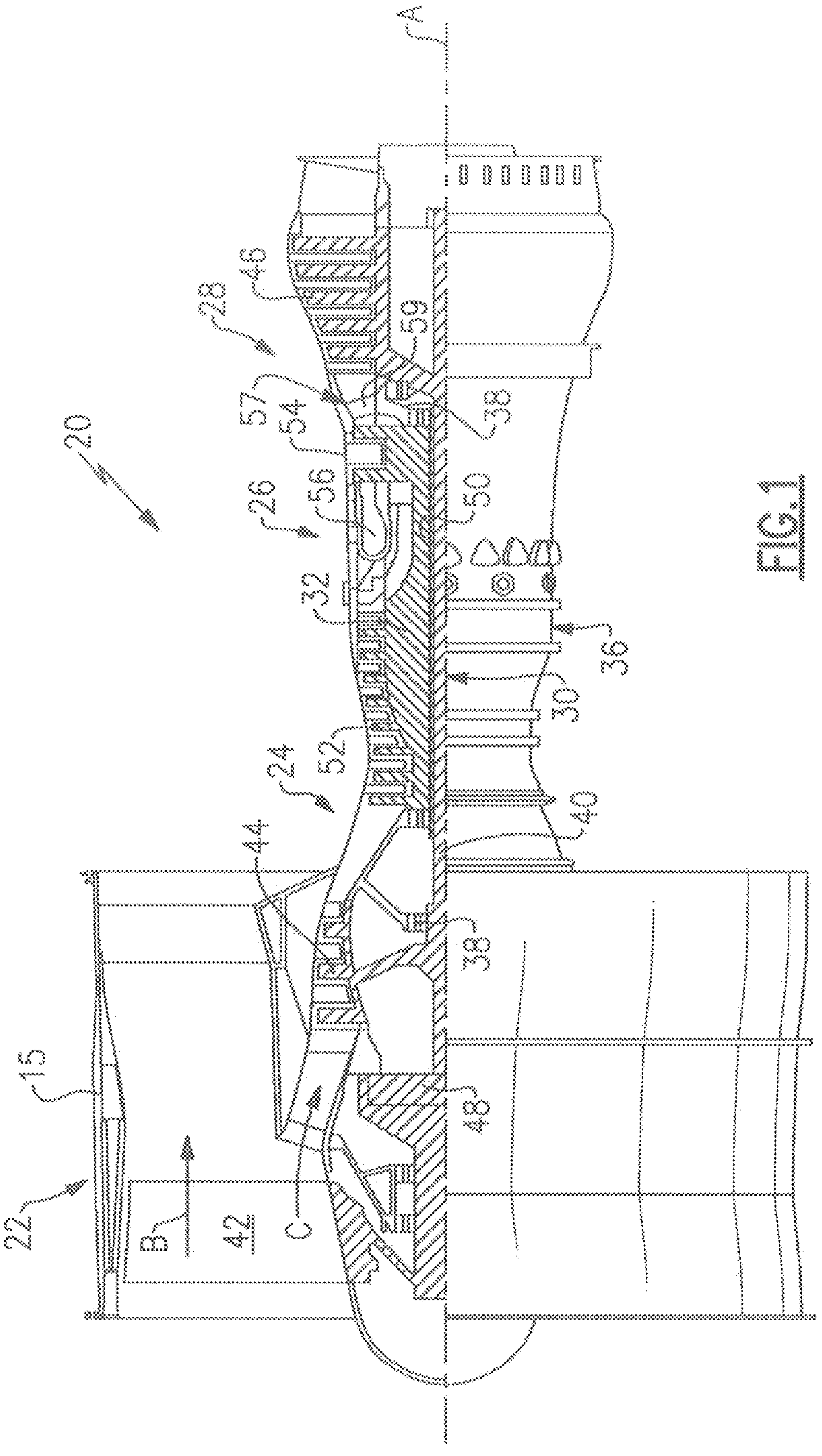
FIG. 1 schematically illustrates a partial cross section of an exemplary gas turbine engine.

The embodiments of the present disclosure can comprise, consist of, and consist essentially of the features and/or steps described herein, as well as any of the additional or optional ingredients, components, steps, or limitations described herein or would otherwise be appreciated by one of skill in the art. It is to be understood that all concentrations disclosed herein are by weight percent (wt. %.) based on a total weight of the composition unless otherwise indicated.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of the embodiments of the inventive concepts, numerous specific details are set forth in order to provide a more thorough understanding of the inventive concepts. It will be apparent to one skilled in the art, however, having the benefit of the instant disclosure that the inventive concepts disclosed herein may be practiced without these specific details.

While the discussion below often makes reference to BOAS and BOAS segments, it should be recognized that the present disclosure is not limited to BOAS but includes other CMC components used within jet engines that may be exposed to high temperature gas flows, for example, combustor liners.

In the discussion below, axial refers to a direction that coincides with the longitudinal axis of the engine. Radial refers to a direction that is radial with respect to the longitudinal axis of the engine. Circumferential refers to a direction that corresponds to the circumference of a circle around the longitudinal axis of the engine. The forward or leading edge/portion of a structure is the edge/portion that faces in the direction toward the flow of the hot gases, i.e., faces upstream. The aft or trailing edge/portion of a structure is the edge/portion that the faces in the direction away from the flow of the hot gases, i.e., faces downstream.

FIG. 1 schematically illustrates an example of a gas turbine engine 20 (i.e., a two-spool turbofan) which includes a fan section 22, a compressor section 24, a combustor section 26, and a turbine section 28. Fan section 22 drives air along a bypass flow path B in a bypass duct defined within a housing 15, and also along a core flow path C for compression in compressor section 24, with subsequent introduction into combustor section 26, followed by expansion through turbine section 28. Although FIG. 1 depicts a two-spool turbofan gas turbine engine, it should be understood that the concepts described herein are not limited to use with two-spool turbofans engines and may be applied to other types of turbine engines.

Engine 20 generally includes a low speed spool 30 and a high speed spool 32 mounted for rotation about an engine central longitudinal axis A, relative to an engine static structure 36, via several bearing systems 38. Various bearing systems 38 at various locations may alternatively or additionally be provided. The location of bearing systems 38 may be varied as appropriate to the application.

The low speed spool 30 generally includes an inner shaft 40 that interconnects, a first (or low) pressure compressor 44 and a first (or low) pressure turbine 46. Inner shaft 40 is connected to fan 42 through a speed change mechanism, which in this exemplary embodiment is illustrated as a geared structure 48 to drive fan 42 at a lower speed than the low speed spool 30. High speed spool 32 includes an outer shaft 50 that interconnects a second (or high) pressure compressor 52 and a second (or high) pressure turbine 54. Combustor 56 is positioned between high pressure compressor 52 and high-pressure turbine 54. A mid-turbine frame 57 of the engine static structure 36 may be arranged generally between the high-pressure turbine 54 and the low-pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core air flow is first compressed by low pressure compressor 44, and then by the high-pressure compressor 52. Thereafter, the core air flow is mixed and burned with fuel in combustor 56, then expanded in high pressure turbine 54 and low-pressure turbine 46. The mid-turbine frame 57 includes airfoils 59 which are in the core airflow path C. The turbines 46 and 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low-pressure compressor, or aft of the combustor section 26 or even aft of turbine section 28, and fan 42 may be positioned forward or aft of the location of gear system 48.

The turbine section 28 includes at least one rotor and at least one blade extending radially outwardly from the rotor. The turbine section 28 may further include a blade outer air seal(s) (BOAS(s)). The blade outer air seal can be an assembly of a plurality of BOAS segments that together form an annular shaped shroud around the engine's central longitudinal axis A which is positioned between an outer casing of the engine and the turbine blade(s) of the turbine section.

As noted above, jet engine components, such as BOAS, BOAS segments, other seals, vane airfoils and platforms therefor, blade airfoils and platforms therefor, and combustor liners, can be made from CMC materials. In general, these CMC components are prepared by first creating a CMC preform which serves as the initial framework for creating the CMC component. The preform contains a stack of fabric sheets or plies in which the stack is formed via a layup process. The plies are made from ceramic fibers, or bundles of ceramic fibers called tows, held together with a binder. The fiber tows can be in the form of unidirectional tows or can be woven fibers. For example, the fibers can be woven into a two-dimensional fabric sheet or ply and then the plies are stacked during the layup process to form the preform. Alternatively, the preform can be in the form of a three-dimensional weave wherein, for example, a plurality of warp fibers are interwoven through a plurality of weft fiber layers. Binders can be used to help hold the fibers/plies together to provide a certain rigidity to the preform, for example, polymeric binders such as polyvinyl alcohol (PVA) or polyvinyl butyral (PVB).

The fibers/filaments used in the CMC preforms may be, for example, silicon carbide (SiC), carbon, mullite, zirconium carbide (ZrC), hafnium carbide (HfC), silicon nitride, aluminum oxide, or combinations thereof. The ceramic fibers may also be oxycarbide-, oxynitride-, carbonitride-, silicate-, boride-, phosphide-, or oxide-based fibers. In still further examples, the fibers are fully crystalline, partially crystalline, or predominantly amorphous or glassy. In one particular example, the fibers are SiC fibers.

The fibers of the preform can, optionally, be provided with one or several interphases deposited prior to introduction of a matrix material into the preform. This interphase coating can be, for example, a coating of boron nitride, silicon-doped boron nitride, boron-doped carbon, boron carbide, titanium nitride, or zirconium nitride which is applied by chemical vapor infiltration (CVI). The interphase coating(s) is used to ensure that the composite will fail in a non-brittle manner by preventing crack formation and/or propagation.

After the CMC preform is formed by the layup, the preform is subjected to densification to add matrix material to fill the remaining void spaces within the preform. This procedure stiffens and strengthens the fiber layers or woven plies of ceramic fiber tows to form the CMC. Thus, densification involves reducing the porosity within the preform, making it more solid and robust, by filing the remaining pores within the preform. The goal is to achieve a higher relative density, and ensure that the final CMC structure is compact and free of large voids. In one particular example, the CMC material contains SiC fibers within a SiC matrix, also referred to as a SiC/SiC composite.

Various methods can be used to add matrix material during densification. These include, but are not limited to, chemical vapor infiltration (CVI), melt infiltration (MI), for example, reactive melt infiltration (RMI) (such as liquid silicon infiltration (LSI)), and polymer infiltration and pyrolysis (PIP).

Figure 2:
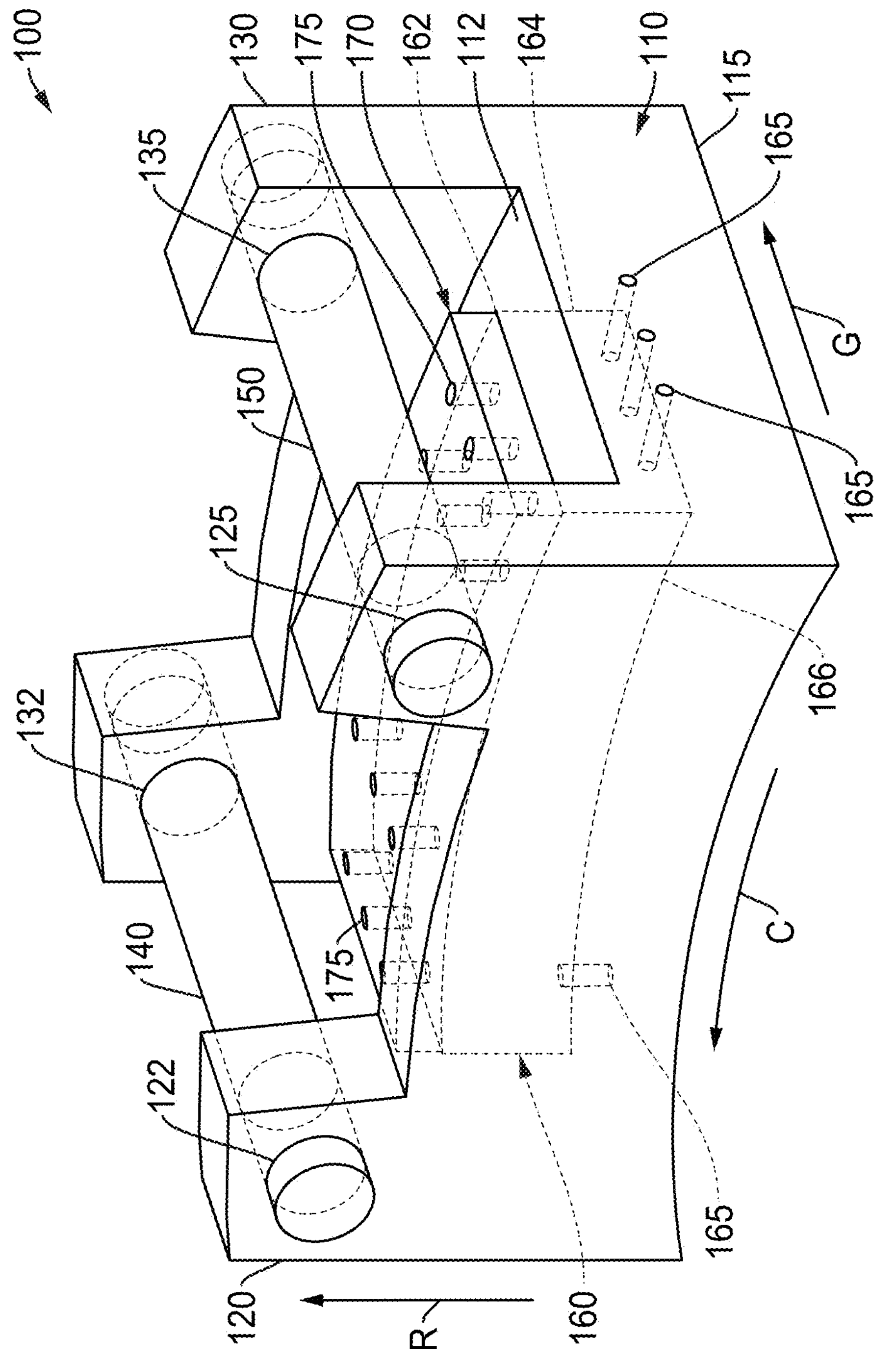
FIG. 2 is a perspective view of a blade outer air seal (BOAS) segment.

FIG. 2 illustrates a CMC component, specifically a blade outer air seal (BOAS) segment 100. In this figure, direction R indicates the radial direction, direction G indicates the axial direction or the direction of flow of hot gases through an engine, and direction C indicates a circumferential direction. The segment 100 includes a base 110 having a radial outer surface 112 and a radial inner surface 115. As shown in this embodiment, the radial outer surface 112 has a convex shape and the radial inner surface 115 has a concave shape. Segment 100 further includes a forward flange structure 120 and an aft flange structure 130. These two flange structures each extend from the radial outer surface 112 of the base 110. These flange structures are load bearing features and provide means for attaching the CMC component to another structure, for example, the outer casing of an engine. The base 110 and flange structures 120, 130 are made of a CMC material comprising a plurality of ceramic fiber plies and a ceramic matrix.

The flange structures are provided with openings to permit the attachment of retention/supporting hardware. As shown in FIG. 2, the forward flange structure 120 has a first opening 122 and a second opening 125. The aft flange structure 130 also has a first opening 132 and a second opening 135. Also shown in FIG. 2 are attachment pins 140 and 150. The first attachment pin 140 passes through the first opening 122 of the forward flange structure 120 and the first opening 132 of the aft flange structure 130. The second attachment pin 150 passes through the second opening 125 of the forward flange structure 120 and the second opening 135 of the second flange structure 130.

The base 110 is also provided with a cooling cavity 160. The cooling cavity 160 extends from the outer radial surface 112 of the base 110 into an interior region of the base 110 and has a cavity opening 162 at the outer radial surface of the base. The cooling cavity 160 is defined by cavity side walls 164 and a cavity bottom wall 166. Additionally, the cooling cavity 160 can be provided with one or more cooling air outlets 165 to provide for the discharge of cooling air from the cooling cavity, for example, discharge though a side wall of base 110 or through the radial inner surface 115. The cooling cavity 160 can optionally be covered by a cover plate or impingement plate 170 in which one or more cooling holes 175 are provided to allow cooling air to enter the cooling cavity 160.

The cooling cavity 160 can be formed in the base prior to densification of the CMC preform by precutting the fiber plies that are to be laid up to form the preform with a cavity or by cutting (machining) the cavity into the preform once the plies are laid up. Alternatively, the cooling cavity can be created by machining after an initial pre-densification, such as by chemical vapor infiltration (CVI), or after final densification.

Figure 3:
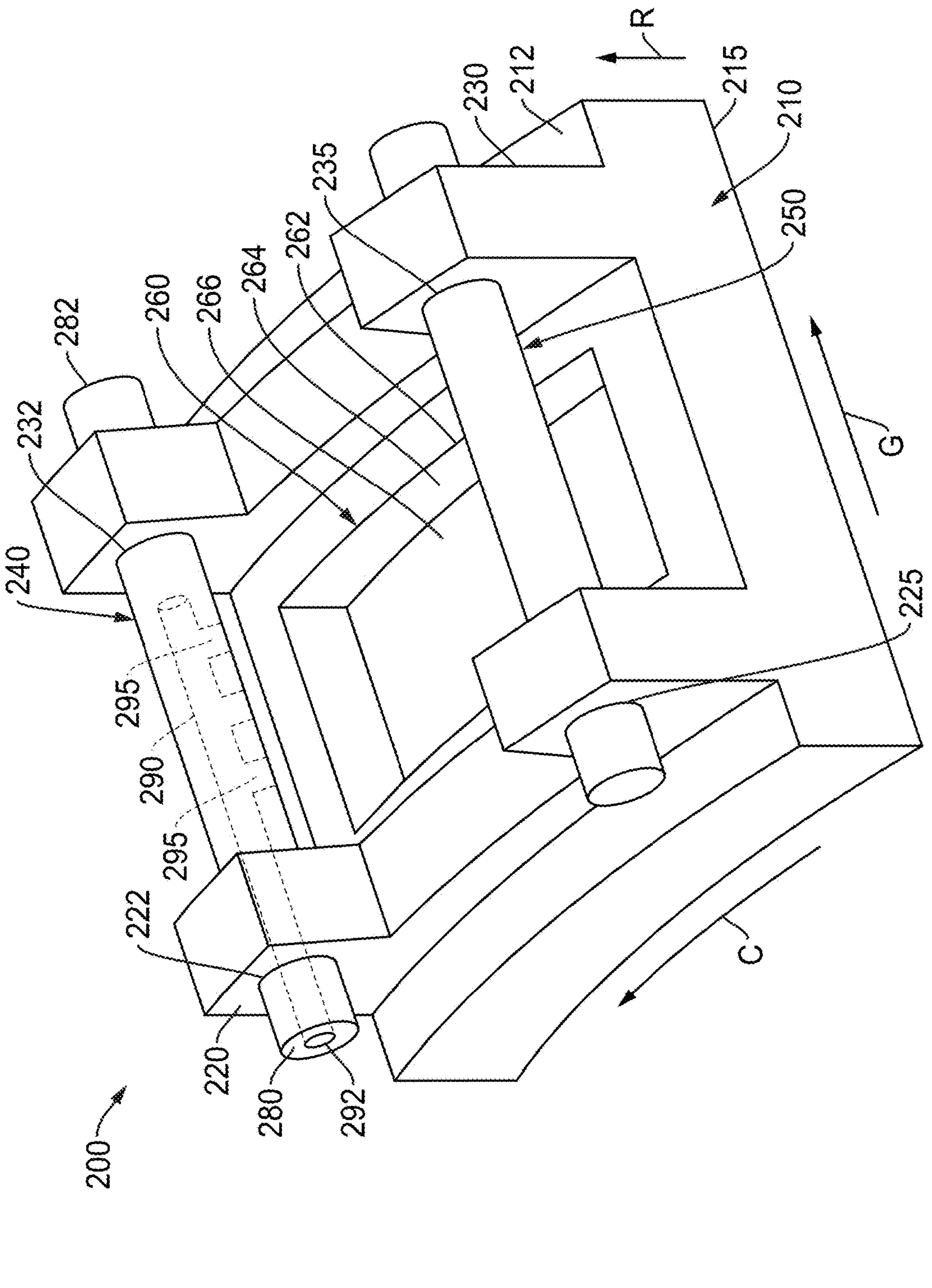
FIG. 3 is a perspective view of a BOAS segment with an attachment pin cooling circuit.

FIG. 3 illustrates a BOAS segment 200 according to the present disclosure in which the attachment pin has a cooling air passageway. As in FIG. 2, in FIG. 3 direction R indicates the radial direction, direction G indicates the axial direction or the direction of flow of hot gases through an engine, and direction C indicates a circumferential direction. The segment 200 includes a base 210 having a radial outer surface 212 which can be concave, a radial inner surface inward surface 215 which can be convex, a forward flange structure 220 and an aft flange structure 230. The forward flange structure 220 has a first opening 222 and a second opening 225. The aft flange structure 230 also has a first opening 232 and a second opening 235. A first attachment pin 240 passes through the first openings 222, 232 of the forward and aft flange structures 220, 230. A second attachment pin 250 passes through the second openings 232, 235 of the forward and aft flange structures 220, 230. Each of attachment pins 240, 250 has an elongated body with a longitudinal axis extending from a first end to a second end. The base 210 is also provided with a cooling cavity 260, having a cavity opening 262, wherein the cooling cavity is defined by cavity side walls 264 and a cavity bottom wall 266.

As shown in FIG. 3, attachment pin 240 has a first end 280 (forward end) and a second end 282 (aft end). Within attachment pin 240 a cooling passageway 290 is provided which is in fluid communication with an inlet opening 292 in the first end 280. The cooling passageway 290 extends axially from the first end 280 of attachment pin 240 along the longitudinal axis thereof. In this embodiment, the cooling passageway 290 does not extend to the second end 282 of the attachment pin 240. Additionally, one or more cooling air outlets 295 extend radially from the cooling air passageway 290 to provide for discharge of cooling air, for example, towards cooling cavity 260. While FIG. 3 only shows attachment pin 240 having the cooling passageway and one or more cooling air outlets extend radially therefrom, it should be understood that attachment pin 250 can also be provided with these features.

In the embodiment of FIG. 3, attachment pins 240, 250 are depicted as being elongated cylinders with a circular cross section. However, it should be noted that other cross sectional shapes are possible. For example, the attachment pins can have a triangular, square, pentagonal, or octagonal cross section.

In operation, cooling air flowing axially from the forward end of the engine to the aft end of the engine can enter cooling air passageway 290 via inlet opening 292 and is discharged in a desired direction via the one or more cooling air outlets 295. To maintain the desired direction of the discharge of cooling air from the cooling air passageway 290 it can be beneficial to provide means for restricting movement, e.g., rotation, of the attachment pin (e.g., when the pin has a circular cross section). This can be achieved by various structures such as a chock and slot arrangement as shown in FIG. 4.

Figure 4:
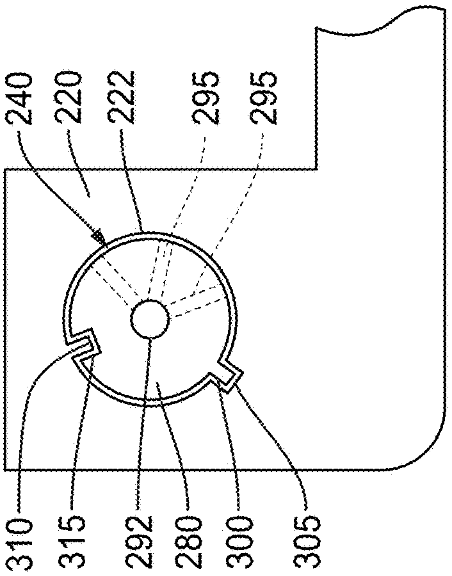
FIG. 4 illustrates a front view of a first end of an attachment pin and flange structure having features to prevent rotation of the attachment pin.

FIG. 4 illustrates a front view of the first end 280 of attachment pin 240. As shown in FIG. 4, the attachment pin 240 and the first opening 222 of the flange structure 220 can be provided with elements to prevent rotational movement of the attachment pin. Preventing rotation of the attachment pin ensures that the cooling air outlets 295 maintain their position and thus maintain the delivery of cooling air towards a desired location, such as towards the cooling cavity 260. In this embodiment, attachment pin 240 is provided with a chock 300 which engages a slot 305 in first opening 222 of the flange structure 220. Alternatively, as also shown in FIG. 4, the first opening 222 can be provided with a chock 310 that engages a slot 315 in the attachment pin 240.

Figure 5:
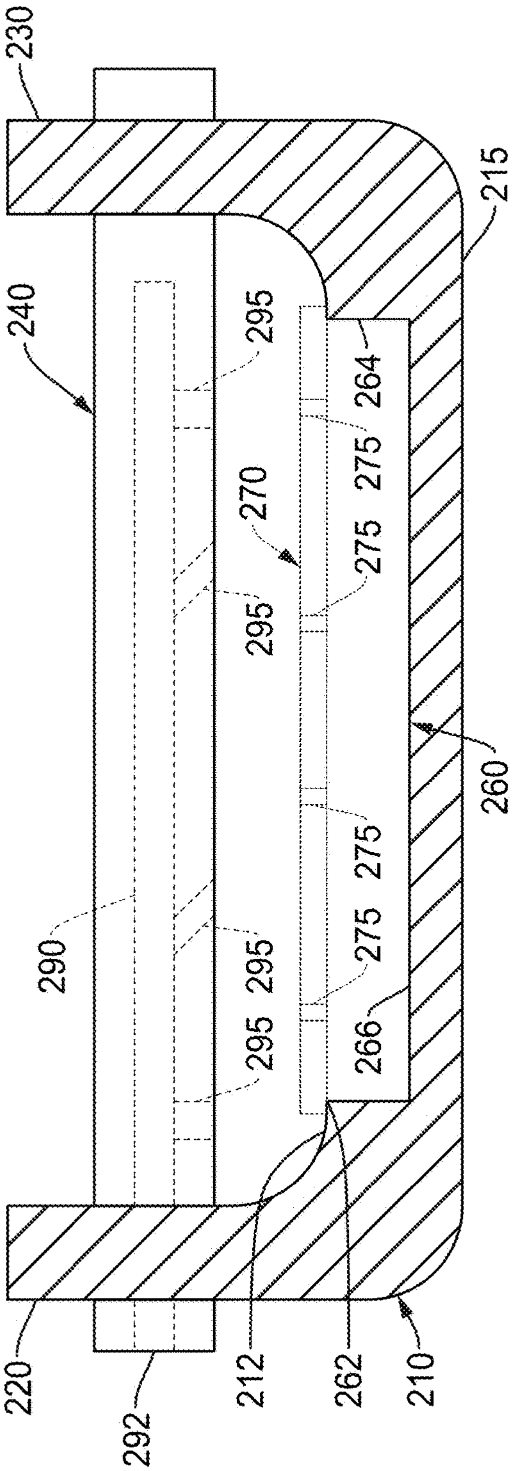
FIG. 5 is a cross sectional view of a BOAS segment with attachment pin cooling circuit.

FIG. 5 is a cross sectional view of a BOAS segment showing attachment pin 240 with a cooling circuit including cooling passageway 290, inlet opening 292, and one or more cooling air outlets 295. Also, in this view, the cooling cavity opening 262 is shown as being optionally covered by impingement plate or cover plate 270 having one or more cooling holes 275. Cooling air passing through cooling passageway 290 is directed by the one or more cooling air outlets 295 towards the impingement plate or cover plate 270 and enters the cooling cavity 260 through cooling holes 275. The spacing of the cooling air outlets 295 along the attachment pin 240 can be uniform or can vary. As shown in FIG. 5, the cooling air outlets 295 can be arranged perpendicular to the cooling passageway 290, which lies along the longitudinal axis of attachment pin 240, or they can be arranged at an angle with respect to the cooling passageway 290, for example, an angle of 15° to 75° or 20° to 60° or 30° to 60°. The angles of the individual cooling air outlets 295 can be uniform (e.g., all outlets 295 angled at 45°) or can vary.

Figure 6:
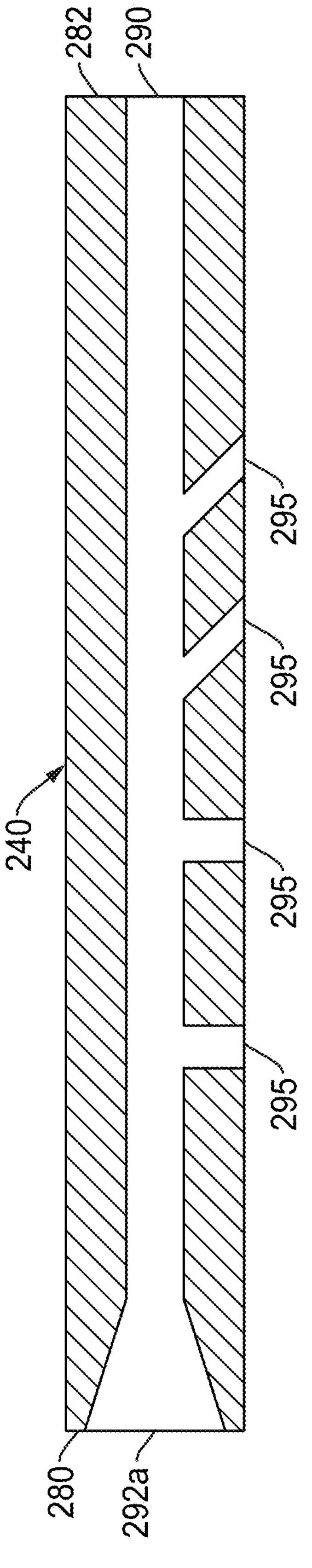
FIG. 6 is a cross sectional view of an embodiment of an attachment pin cooling circuit.

FIG. 6 shows a cross section of attachment pin 240 having a cooling circuit in which cooling passageway 290 passes through the entire attachment pin, i.e., from the first end 280 to the second end 282. Such an arrangement can be used if it is desired to provide cooling air to a region aft of the BOAS segment. Such an arrangement will also permit cooling air to be fed to the cooling passageway 290 via both first end 280 and the second end 282 of the attachment pin 240.

Figure 7:
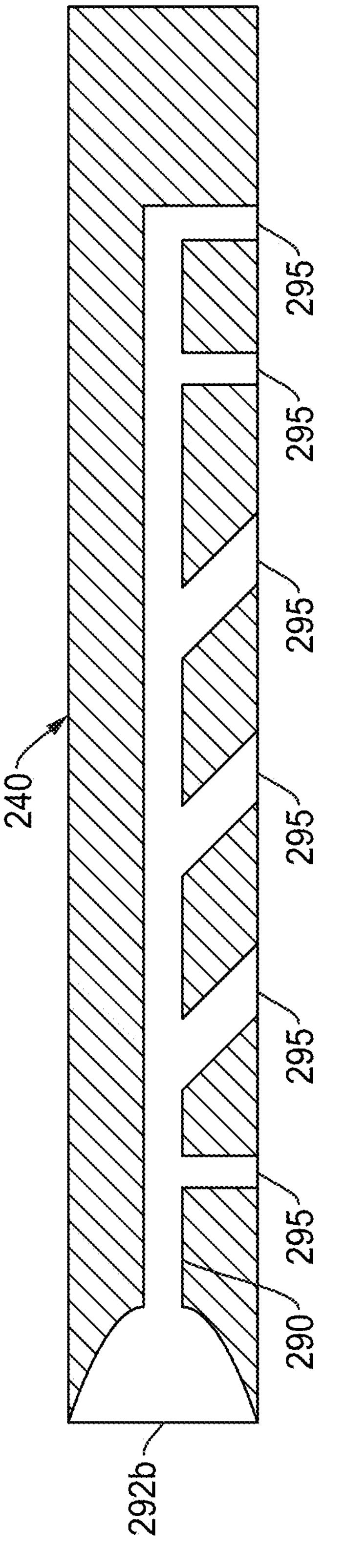
FIG. 7 is a cross sectional view of another embodiment of an attachment pin cooling circuit.

Additionally, FIG. 6 shows a modified inlet opening region which extends from the inlet opening **292*a* to the cooling air passageway 290. The inlet region has a decreasing diameter from the inlet opening 292*a* to the cooling air passageway 290 and exhibits an overall cone-shape or frustoconical shape. FIG. 7 shows another modified inlet opening region having a decreasing diameter from the inlet opening 292*b* to the cooling air passageway 290**. In this embodiment, the inlet opening region exhibits an overall bell shape.

The attachment pins can be made from metallic materials, for example, metal alloys such as Ni-based and Co-based superalloys. The cooling circuits can be formed in the attachment pins by appropriate machining such as drilling. Alternatively, the attachment pin can be produced as a hollow extrusion in which the cooling air passageway is formed by extrusion through a die. As a further alternative, the attachment pins can be made by additive manufacturing, e.g., 3-D printing.

The present disclosure provides an efficient method for directing cooling air in conjunction with cooling CMC components. Portions of the cooling air can be directed through attachment pins towards, for example, an outer radial surface of the CMC component, cooling cavities within the interior of CMC components, and/or to an aft region of the CMC component. Directing portions of the cooling air flow can aid in reducing the formation of thermal stresses resulting from the thermal differentials within the CMC component.

While the present disclosure has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present disclosure.

What is claimed is:

1. A ceramic matrix composite (CMC) component comprising:

a base having a radial outer surface and a radial inner surface, the base comprising a plurality of ceramic fiber plies and a ceramic matrix, a forward flange structure and an aft flange structure each extending from the radial outer surface of the base, the forward flange structure having a first opening and a second opening, and the aft flange structure has a first opening and a second opening, and a first attachment pin and a second attachment pin for attaching the CMC component to a support structure, the first attachment pin passing through the first opening of the forward flange structure and the first opening of the aft flange structure, and the second attachment pin passing through the second opening of the forward flange structure and the second opening of the aft flange structure, wherein each of the attachment pins comprises an elongated body with a longitudinal axis extending from a first end to a second end, a cooling passageway extending axially from the first end along the longitudinal axis, and one or more cooling air outlets extend radially from the cooling air passageway to provide for discharge of fluid from the cooling passageway, and wherein the base further comprises at least one cooling cavity that extends from the radial outer surface of the base into an interior region of the base, the at least one cooling cavity having a cavity opening at the radial outer surface of the base, the at least one cooling cavity being defined by cavity side walls and a cavity bottom wall, and wherein the one or more cooling air outlets direct cooling air towards the at least one cooling cavity.

2. The CMC component according to claim 1, wherein the cooling air passageway extends from the first end to the second end.

3. The CMC component according to claim 1, wherein the cooling air passageway does not extend to the second end.

4. The CMC component according to claim 1, wherein each attachment pin has a circular cross section.

5. The CMC component according to claim 1, wherein each attachment pin has a triangular, square, pentagonal, or octagonal cross section.

6. The CMC component according to claim 1, wherein the one or more cooling air outlets includes at least one cooling outlet that directs cooling air towards the radial outer surface of the base.

7. The CMC component according to claim 1, wherein the one or more cooling air outlets includes at least one cooling outlet that directs cooling air at an angle towards the radial outer surface of the base.

8. The CMC component according to claim 1, wherein the cooling air passageway in each attachment pin extends from an inlet opening in the first end of the attachment pin to an outlet opening in the second end of the attachment pin.

9. The CMC component according to claim 1, wherein each attachment pin has an inlet region extending from an inlet opening in the first end of each attachment pin to the cooling air passageway, and wherein the inlet region has a decreasing diameter from the inlet opening to the cooling air passageway.

10. The CMC component according to claim 9, wherein the inlet region of each attachment pin has a frustoconical shape or is bell-shaped.

11. The CMC component according to claim 1, wherein each attachment pin includes a chock that interacts with a slot within a respective attachment opening in the forward flange structure and/or aft flange structure to prevent rotation of the attachment pin, or each attachment pin includes a slot that interacts with a chock in a respective attachment opening in the forward flange structure and/or aft flange structure to prevent rotation of the attachment pin.

12. The CMC component according to claim 1, wherein the at least one cooling cavity is covered by a cover plate or impingement plate having one or more cooling holes to allow cooling air directed by the one or more cooling air outlets to enter the at least one cooling cavity.

13. The CMC component according to claim 1, wherein the component is a blade outer air seal (BOAS) segment.

14. A BOAS assembly comprising a plurality of BOAS segments according claim 13, wherein the BOAS segments are arranged to form an annular shaped structure.

15. A method of cooling a CMC component, the method comprising:

providing a CMC component comprising:

a base having a radial outer surface and a radial inner surface, the base comprising a plurality of ceramic fiber plies and a ceramic matrix, and a forward flange structure and an aft flange structure each extending from the radial outer surface of the base, the forward flange structure having a first opening and a second opening, and the aft flange structure having a first opening and a second opening, and providing a first attachment pin and a second attachment pin for attaching the CMC component to a support structure, the first attachment pin passing through the first opening of the forward flange structure and the first opening of the aft flange structure, and the second attachment pin passing through the second opening of the forward flange structure and the second opening of the aft flange structure, wherein each of the attachment pins comprises an elongated body with a longitudinal axis extending from a first end to a second end, a cooling passageway extending axially from the first end along the longitudinal axis, and one or more cooling air outlets extend radially from the cooling air passageway to provide for discharge of fluid from the cooling passageway, and wherein the base further comprises at least one cooling cavity that extends from the radial outer surface of the base into an interior region of the base, the at least one cooling cavity having a cavity opening at the radial outer surface of the base, the at least one cooling cavity being defined by cavity side walls and a cavity bottom wall, and wherein the one or more cooling air outlets direct cooling air towards the at least one cooling cavity.

16. The method according to claim 15, wherein the one or more cooling air outlets includes at least one cooling outlet that directs cooling air towards the radial outer surface of the base.

17. A turbine engine comprising:

a fan section, a compressor section, a combustion chamber, and a turbine section, the turbine section includes at least one rotor and one or more turbine blade(s) extending radially outwardly from the at least one rotor;

a blade outer air seal assembly positioned between the one or more turbine blade(s) and an outer casing to the engine;

wherein the blade outer air seal assembly is formed of a plurality of blade outer air seal segments, wherein each blade outer air seal segment comprises:

a base having a radial outer surface and a radial inner surface, the base comprising a plurality of ceramic fiber plies and a ceramic matrix, a forward flange structure and an aft flange structure each extending from the radial outer surface of the base, the forward flange structure having a first opening and a second opening, and the aft flange structure has a first opening and a second opening, and a first attachment pin and a second attachment pin for attaching the CMC component to a support structure, the first attachment pin passing through the first opening of the forward flange structure and the first opening of the aft flange structure, and the second attachment pin passing through the second opening of the forward flange structure and the second opening of the aft flange structure, wherein each of the attachment pins comprises an elongated body with a longitudinal axis extending in an axial direction from a first end to a second end, a cooling passageway extending axially from the first end along the longitudinal axis, and one or more cooling air outlets extend radially from the cooling air passageway to provide for discharge of fluid from the cooling passageway, and wherein the base further comprises at least one cooling cavity that extends from the radial outer surface of the base into an interior region of the base, the at least one cooling cavity having a cavity opening at the radial outer surface of the base, the at least one cooling cavity being defined by cavity side walls and a cavity bottom wall, and wherein the one or more cooling air outlets direct cooling air towards the at least one cooling cavity.

* * * * *